(12) United States Patent
Guo et al.

(10) Patent No.: US 12,333,742 B2
(45) Date of Patent: Jun. 17, 2025

(54) OBJECT TRACKING INTEGRATION METHOD AND INTEGRATING APPARATUS

(71) Applicant: Wistron Corporation, New Taipei (TW)

(72) Inventors: Jiun-In Guo, Hsinchu (TW); Jhih-Sheng Lai, Hsinchu (TW)

(73) Assignee: Wistron Corporation, New Taipei (TW)

( * ) Notice: Subject to any disclaimer, the term of this patent is extended or adjusted under 35 U.S.C. 154(b) by 386 days.

(21) Appl. No.: 17/852,378

(22) Filed: Jun. 29, 2022

(65) Prior Publication Data

US 2023/0334675 A1 Oct. 19, 2023

(30) Foreign Application Priority Data

Apr. 13, 2022 (TW) .................................. 111114105

(51) Int. Cl.
*G06T 7/292* (2017.01)
*G06T 7/70* (2017.01)
*G06V 10/25* (2022.01)
*G06V 10/75* (2022.01)

(52) U.S. Cl.
CPC ................ *G06T 7/292* (2017.01); *G06T 7/70* (2017.01); *G06V 10/25* (2022.01); *G06V 10/751* (2022.01); *G06V 10/753* (2022.01); *G06T 2207/20132* (2013.01); *G06T 2207/20212* (2013.01); *G06T 2207/30241* (2013.01); *G06V 2201/07* (2022.01)

(58) Field of Classification Search
CPC . G06T 7/292; G06T 7/70; G06T 2207/20132; G06T 2207/20212; G06T 2207/30241; G06V 10/25; G06V 10/753; G06V 10/751; G06V 2201/07; H04N 23/80; H04N 23/90
See application file for complete search history.

(56) References Cited

U.S. PATENT DOCUMENTS

2017/0148174 A1\* 5/2017 Kim ........................ H04N 23/90
2021/0225065 A1\* 7/2021 Holzer ................. H04N 23/611

FOREIGN PATENT DOCUMENTS

| CN | 111476827 | 7/2020 |
| JP | 2019121019 | 7/2019 |
| TW | 201242368 | 10/2012 |
| TW | 201838401 | 10/2018 |

\* cited by examiner

*Primary Examiner* — Matthew C Bella
*Assistant Examiner* — Jinsu Hwang
(74) *Attorney, Agent, or Firm* — JCIPRNET

(57) ABSTRACT

An object tracking integration method and an integrating apparatus are provided. In the method, one or more first images and one or more second images are obtained. The first image is captured from a first capturing apparatus, and the second image is captured from a second capturing apparatus. One or more target objects in the first image and in the second image are detected. A detection result of the target object in the first image and a detection result of the target object in the second image are matched. The detection result of the target object is updated according to a matching result between the detection results of the first image and the second image. Accordingly, the accuracy of the association and the monitoring range may be improved.

18 Claims, 10 Drawing Sheets

OBJECT TRACKING INTEGRATION METHOD AND INTEGRATING APPARATUS

CROSS-REFERENCE TO RELATED APPLICATION

This application claims the priority benefit of Taiwanese application no. 111114105, filed on Apr. 13, 2022. The entirety of the above-mentioned patent application is hereby incorporated by reference herein and made a part of this specification.

BACKGROUND

Technical Field

The invention relates to an image detection technology, and particularly relates to an object tracking integration method and an integrating apparatus.

DESCRIPTION OF RELATED ART

In recent years, technologies in communications, sensing, semiconductors, and so on have developed rapidly. How to use these advanced technologies to solve existing problems is one of the popular research and development topics. In our daily life, for safety-related issues, roads, stores, companies, or houses are installed with surveillance systems to facilitate monitoring specific regions. Although a user may view a monitoring screen in real time, the cost of manual monitoring is high, and human negligence is unavoidable.

It should be noted that the existing image recognition technology may help to detect specific objects. However, limited by a photographing field of view, it may be required to deploy multiple image capturing apparatuses (for example, cameras or video cameras). In addition, images captured by different cameras or video cameras are not further integrated, and it is still required to manually check association between different images.

SUMMARY

The invention is directed to an object tracking integration method and an integrating apparatus, which are adapted to associate targets detected in images captured by a plurality of image capturing apparatuses, so as to increase a surveillance range.

An embodiment of the invention provides an object tracking integration method including (but not limited to) the following steps. One or a plurality of first images and one or a plurality of second images are obtained. The first image is from a first image capturing apparatus, and the second image is from a second image capturing apparatus. One or a plurality of target objects in the first image and in the second image are detected. A detection result of the target object in the first image and a detection result of the target object in the second image are matched. The detection result of the target object is updated according to a matching result between the detection result of the first image and the detection result of the second image.

An embodiment of the invention provides an integrating apparatus including (but not limited to) a memory and a processor. The memory is configured to store a program code. The processor is coupled to the memory. The processor is configured to load and execute the program code to: obtain one or a plurality of first images and one or a plurality of second images, detect one or a plurality of target objects in the first image and in the second image, match a detection result of the target object in the first image and a detection result of the target object in the second image, and update the detection result of the target object according to a matching result between the detection result of the first image and the detection result of the second image. The first image is from a first image capturing apparatus, and the second image is from a second image capturing apparatus.

Based on the above description, according to the object tracking integration method and the integrating apparatus of the embodiments of the invention, the detection results of the images from different image capturing apparatuses are merged. Accordingly, the monitoring coverage may be increased, and a monitoring blind spot of a single image capturing apparatus may be mitigated.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
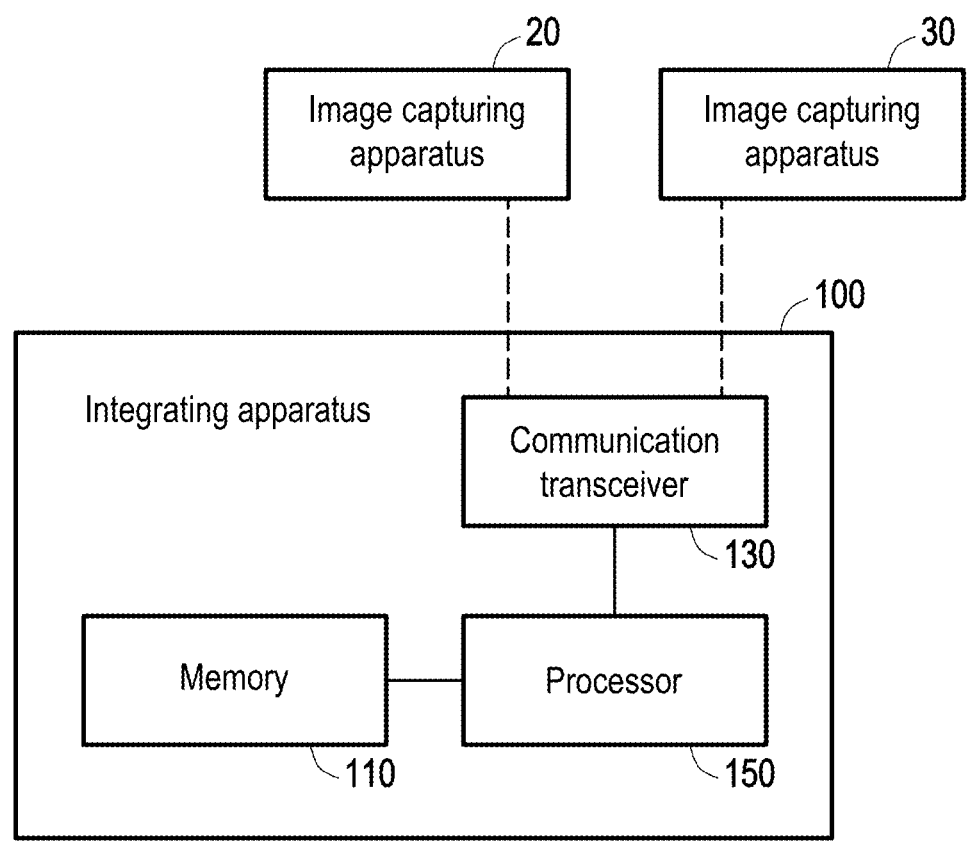
FIG. 1 is a component block diagram of a system according to an embodiment of the invention.

FIG. 1 is a component block diagram of a system 1 according to an embodiment of the invention. Referring to FIG. 1, the system 1 includes (but is not limited to) a first image capturing apparatus 20, a second image capturing apparatus 30, and an integrating apparatus 100. It should be noted that, in FIG. 1, two image capturing apparatuses are taken as an example for description, but the number of the image capturing apparatuses is not limited thereto.

The first image capturing apparatus 20 and the second image capturing apparatus 30 may be cameras, video cameras, monitors, smart phones, or road side units with an image capturing function, and used to capture images within a specified field of view.

The integrating apparatus 100 may be a smart phone, a tablet computer, a server, a cloud host, or a computer host.

The integrating apparatus 100 includes (but is not limited to) a memory 110, a communication transceiver 130, and a processor 150.

The memory 110 may be any type of a fixed or removable random access memory (RAM), a read only memory (ROM), a flash memory (flash memory), a conventional hard disk (HDD), a solid-state drive (SSD), or a similar component. In one embodiment, the memory 110 is used for storing program codes, software modules, configurations, data (for example, images, detection results, etc.) or files, and embodiments thereof will be described in detail later.

The communication transceiver 130 may be a communication transceiver, a serial communication interface (such as RS-232) that support mobile communication of fourth generation (4G) or other generations, Wi-Fi, bluetooth, infrared, radio frequency identification (RFID), Ethernet (Ethernet), optical network, or may be a universal serial bus (USB), a thunderbolt, or other communication transmission interface. In the embodiment of the invention, the communication transceiver 130 is used for transmitting or receiving data to/from other electronic devices (for example, the image capturing apparatuses 20 and 30).

The processor 150 is coupled to the memory 110 and the communication transceiver 130. The processor 150 may be a central processing unit (CPU), a graphics processing unit (GPU), or other programmable general-purpose or special-purpose microprocessors, a digital signal processor (DSP), a programmable controller, a field programmable gate array (FPGA), an application-specific integrated circuit (ASIC), a neural network accelerator or other similar components, or a combination of the above components. In an embodiment, the processor 150 is configured to execute all or a part of operations of the integrating apparatus 100, and may load and execute various program codes, software modules, files and data stored in the memory 110. In some embodiments, the functions of the processor 150 may be implemented through software or a chip.

In some embodiments, any one of the first image capturing apparatus 20 and the second image capturing apparatus 30 may be integrated with the integrating apparatus 100 to form an independent apparatus.

Hereinafter, the method described in the embodiment of the invention will be described in collaboration with various devices, components, and modules in the system 1. Each process of the method may be adjusted according to an actual implementation situation, and is not limited thereto.

Figure 2:
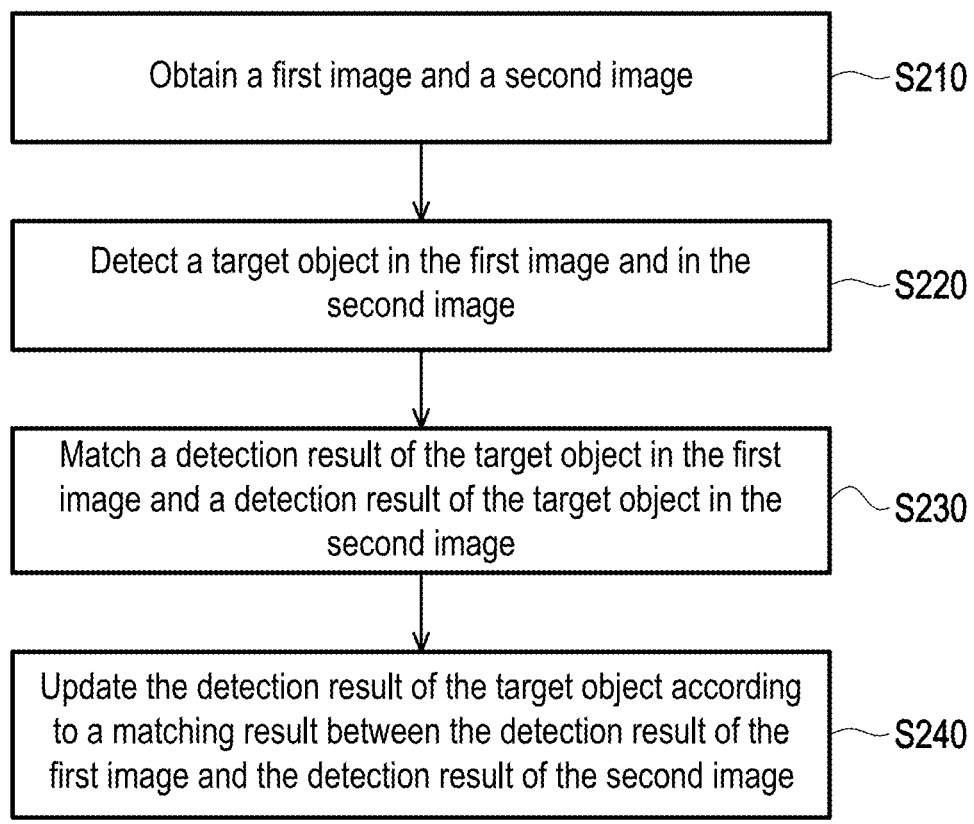
FIG. 2 is a flowchart of an object tracking integration method according to an embodiment of the invention.

FIG. 2 is a flowchart of an object tracking integration method according to an embodiment of the invention. Referring to FIG. 2, the processor 150 obtains one or a plurality of first images and one or a plurality of second images (step S210). To be specific, the first image is from the first image capturing apparatus 20, and the second image is from the second image capturing apparatus 30. A photographing angle and/or a photographing direction of the first image capturing apparatus 20 is different from that of the second image capturing apparatus 30. A photographing range of the first image capturing apparatus 20 and a photographing range of the second image capturing apparatus 30 are at least partially overlapped.

Figure 3A:
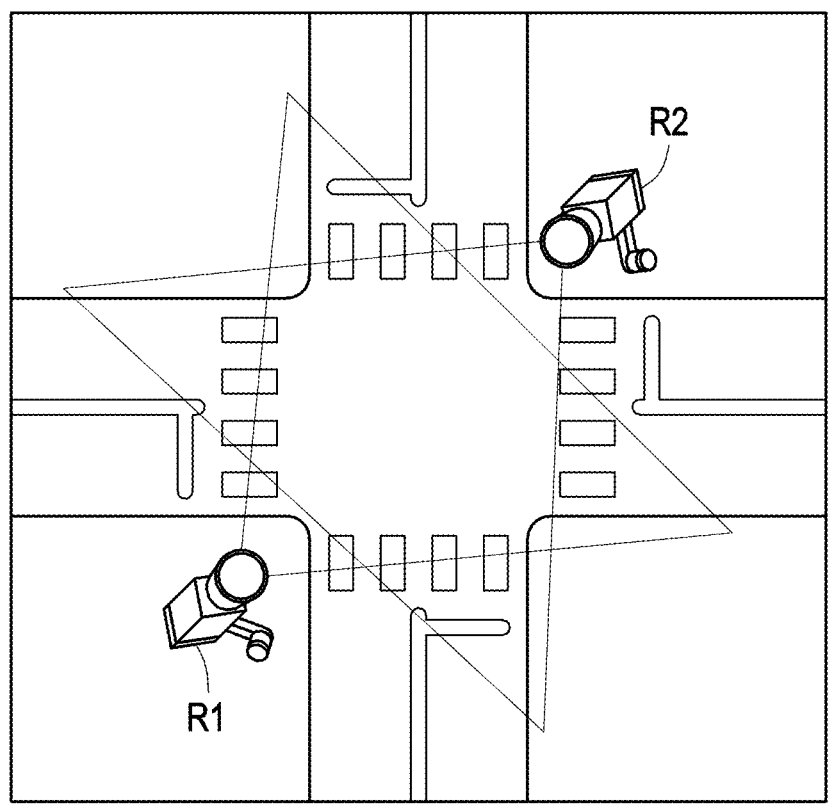
FIG. 3A is a schematic diagram of road side units according to an embodiment of the invention.

For example, FIG. 3A is a schematic diagram of road side units (RSUs) R1 and R2 according to an embodiment of the invention. Referring to FIG. 3A, the road side units R1 and R2 are disposed at two opposite corners of an intersection. An overlapped photographing range (two triangles in the figure) of the image capturing apparatuses on the two road side units R1 and R2 roughly cover four zebra stripes. It should be noted that the photographing range shown in FIG. 3A is only used as an example, and its shape, size, position, and setting environment may be changed. For example, the first image capturing apparatus 20 and the second image capturing apparatus 30 are monitors in a store, a lobby, or a parking lot, and may be installed at any location.

The processor 150 detects one or a plurality of target objects in the one or plurality of first images and the one or plurality of second images (step S220). To be specific, the target object may be a person, an animal, a vehicle, a machine, or other specific objects. For an image of a single frame, an object detection technology may be used. There are many algorithms for object detection, for example, YOLO (you only look once), SSD (single shot detector), or R-CNN. For multiple consecutive images, an (multi) object tracking technology may be used. A main function of object tracking is to track a same object framed by preceding and following image frames. There are also many algorithms for object tracking, for example, optical flow, simple online and realtime tracking (SORT) or Deep SORT, joint detection, and embedding (JDE).

In an embodiment, a detection result of the target object includes representative information of the target object, for example, an object type, a bounding box, an identification code, and/or coordinates. Taking a road side unit application as an example, the object type may be pedestrian, bicycle, motorcycle, car, and large vehicle. The bounding box (or referred to as region of interest (ROI)) is a region used to frame the target object in an image. In an embodiment, the bounding box may be displayed on the image in different colors, for example, black, red, blue, yellow, and/or green, etc. The identification code (or referential number) is a specific code form to distinguish the different object types or target objects. The coordinates are pixel coordinates in the first image or the second image, and may be located anywhere within a range covered by the bounding box.

Figure 3B:
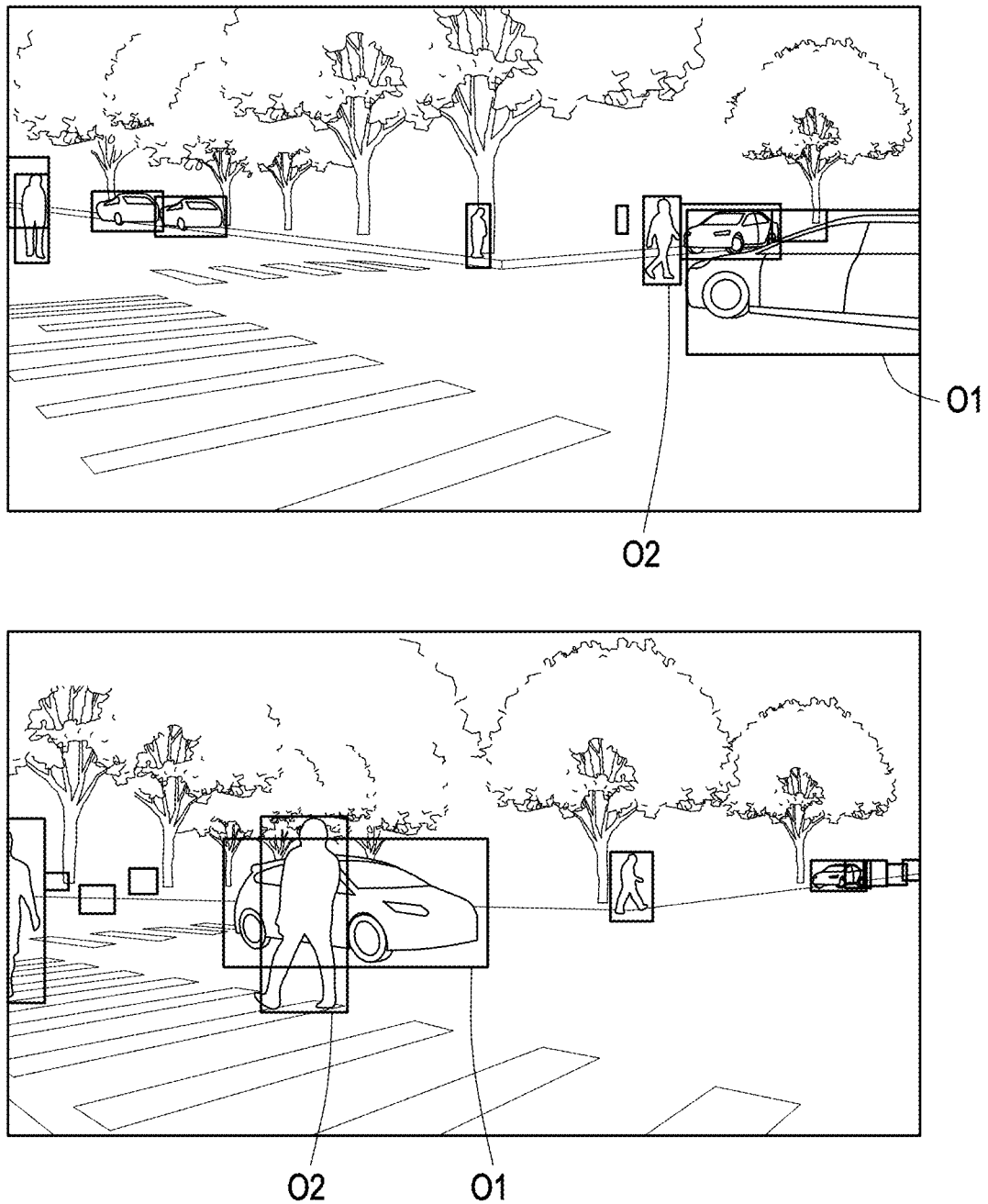
FIG. 3B is a schematic diagram of a detection result according to an embodiment of the invention.

For example, FIG. 3B is a schematic diagram of a detection result according to an embodiment of the invention. Referring to FIG. 3, taking a setting environment of a road side unit as an example, the left and right images are respectively a first image and a second image. In the two images, a target object O1 (taking a car as an example) and a target object O2 (taking a pedestrian as an example) are respectively detected. In an embodiment, for example, the symbols "O1" and "O2" may be used as identification codes of the car and the pedestrian.

In an embodiment, the processor 150 may crop out a (small) region of interest from a first image to generate a cropped image with only this region of interest. Namely, the cropped image is a part of the image that is cropped. This cropped image may be used to detect smaller target objects. The processor 150 may respectively detect one or a plurality of target objects in the first image and the cropped image through a detection model based on deep learning, and combine detection results of the target object in the first image and the cropped image. For example, to take a union of the detection results of the two images. During the combination process, if any one of the same target objects is detected in the first image and the cropped image at the same time, an intersection over union (IoU) may be difficult to be filtered out by a non-maximum suppression (NMS) algorithm. Therefore, the processor 150 may exclude near-border detection from the detection result of the cropped image. Then, the processor 150 may re-use the NMS algorithm to obtain a final result of both. It should be noted that the aforementioned first image may be replaced with a second image, and detail thereof is not repeated.

Figure 4:
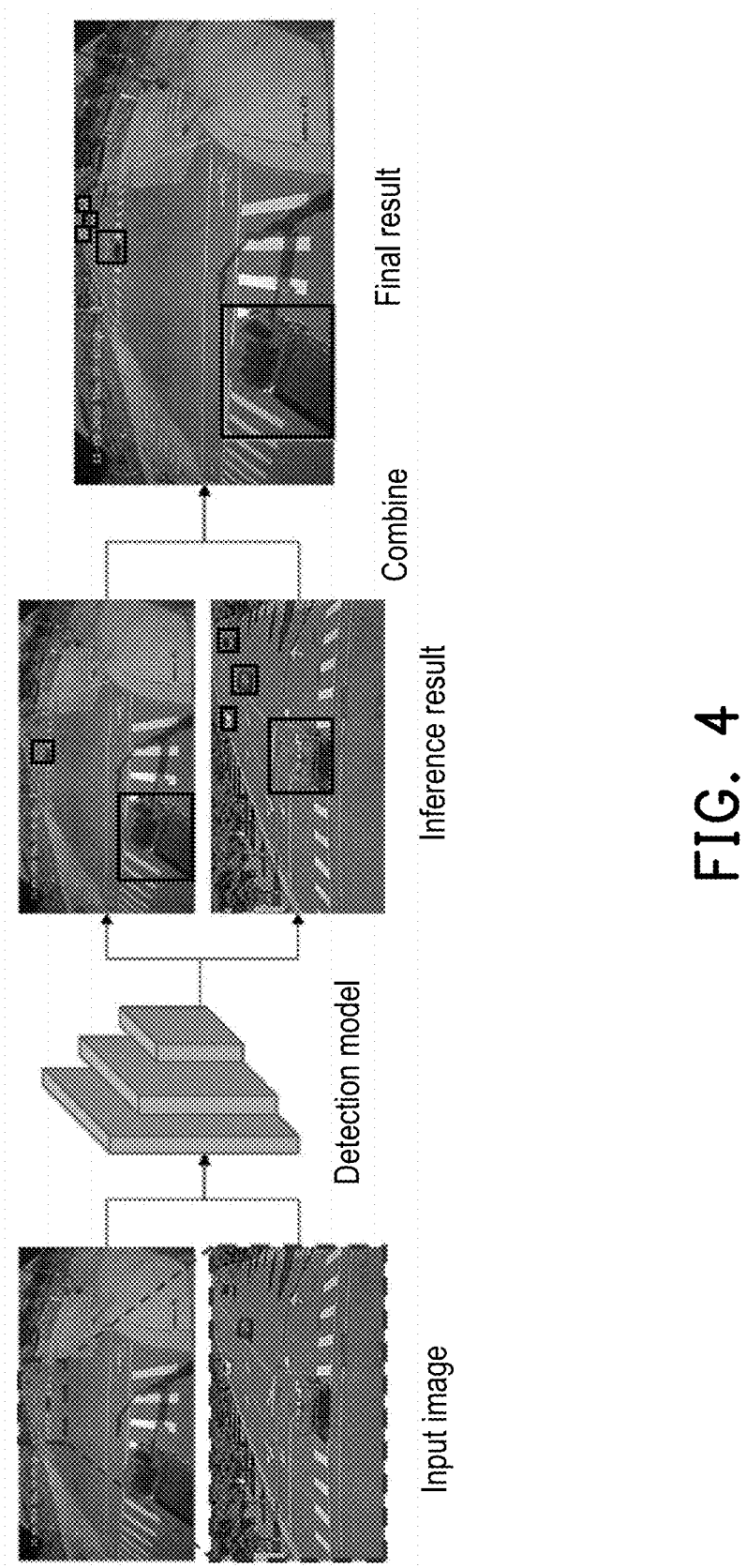
FIG. 4 is a schematic diagram of multi-size detection according to an embodiment of the invention.

FIG. 4 is a schematic diagram of multi-size detection according to an embodiment of the invention. Referring to FIG. 4, a lower image in an input image is a cropped image of an upper image. A detection model may respectively infer the two images to obtain a detection result. As shown in a lower image of the inference result (i.e., the detection result), compared to the upper image, three more cars are detected (marked by black bounding boxes in the image). After excluding duplicate detections, a final combination result includes five cars (marked by the black bounding boxes in the image).

Figure 5:
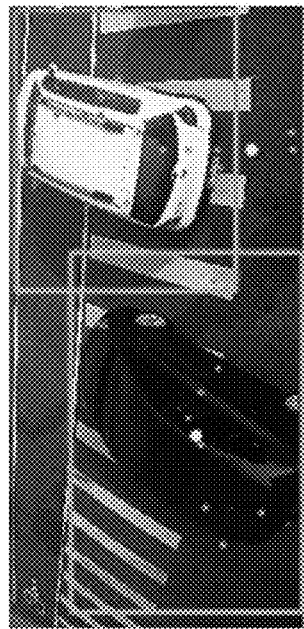
FIG. 5 is a schematic diagram of bounding boxes of a detection result and a tracking result according to an embodiment of the invention.
Figure 5:
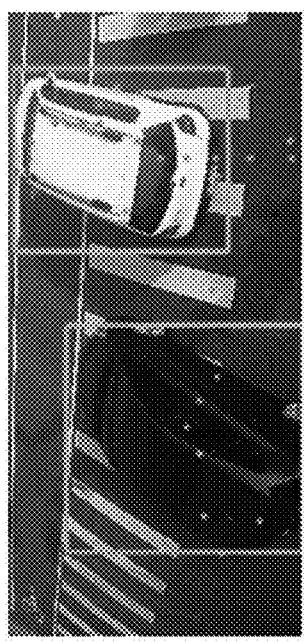

It should be noted that in some high-speed moving environments (for example, roads or railways), the detection results of object tracking may be unstable. For example, FIG. 5 is a schematic diagram of bounding boxes of a detection result and a tracking result according to an embodiment of the invention. Referring to FIG. 5, some parts of the bounding box of the tracking result may not be correctly close to the edge of the target object (taking a car as an example). In an embodiment, for the tracking matching detection, the processor 150 may use the bounding box obtained from object detection to replace the bounding box obtained from object tracking. For the tracking that does not match the detection, the processor 150 may predict a position thereof by using a Kalman filter. In addition, for different object types, the processor 150 may assign the objects to different groups according to similarities, so as to facilitate identification of stable tracking.

In an embodiment, the detection result includes a pixel position. The processor 150 may transform a pixel position of one or plurality of target objects in one or plurality of first images and one or plurality of second images into a position and a moving speed in a common space by using homography transformation. To be specific, since the photographing angles and/or photographing directions of the image capturing apparatuses 20 and 30 are different, the positions of the target objects in the image may be converted into the common space (or coordinate system) for subsequent matching (association or merging) requirements.

The common space is, for example, a latitude and longitude coordinate system, and an equation of coordinate conversion is as follows:

$$s \begin{bmatrix} u \\ v \\ 1 \end{bmatrix} = H \begin{bmatrix} x \\ y \\ 1 \end{bmatrix} = \begin{bmatrix} h_{11} & h_{12} & h_{13} \\ h_{21} & h_{22} & h_{23} \\ h_{31} & h_{32} & 1 \end{bmatrix} \begin{bmatrix} x \\ y \\ 1 \end{bmatrix} \quad (1)$$

S is a scaling factor after homography transformation, u and v are pixel coordinates, H is a homography matrix ($h_{11}$, $h_{12}$, $h_{13}$, $h_{21}$, $h_{22}$, $h_{23}$, $h_{31}$, $h_{32}$, and $h_{33}$ are elements in the matrix) converted from latitude and longitude coordinates to pixel coordinates, and x, y are the latitude and longitude coordinates corresponding to u, v. The homography matrix may be derived from the known pixel coordinates and the corresponding latitude and longitude coordinates. Then, the pixel coordinates are converted into latitude and longitude coordinates through an inverse matrix. It should be noted that the common space may also be other two-dimensional or three-dimensional spaces or coordinate systems. For example, a spherical polar coordinate system or other geographic coordinate systems.

After determining the position (or coordinates) of the common space, the processor 150 may determine a moving distance, trajectory and moving speed based on the images of the preceding and following frames. In addition, the processor 150 may also map the trajectory or position of the target object onto an electronic map.

Figure 6:
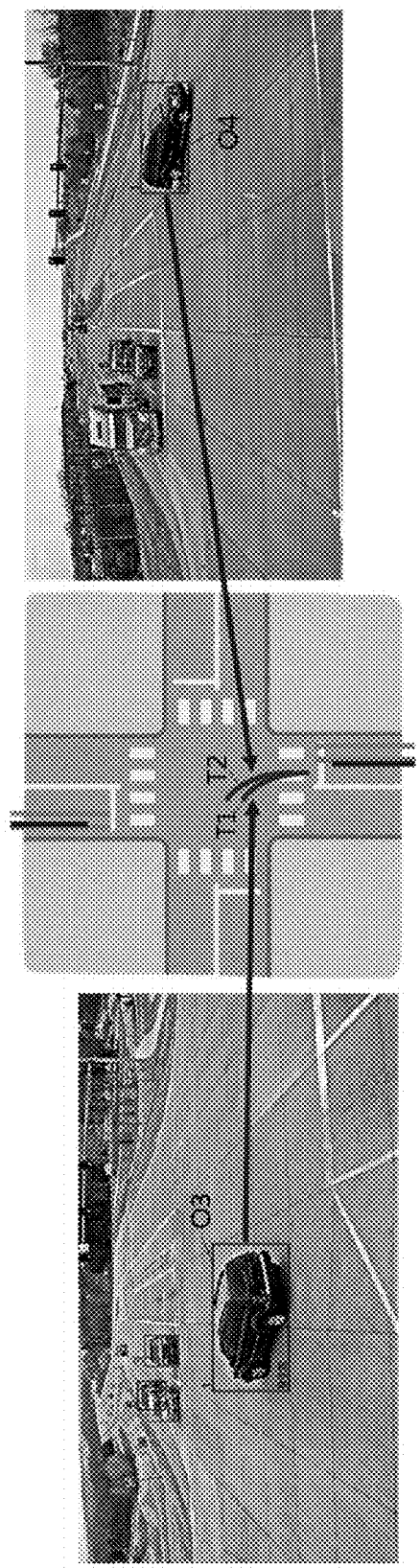
FIG. 6 is a schematic diagram of trajectory matching according to an embodiment of the invention.

Referring to FIG. 2, the processor 150 matches a detection result of one or a plurality of target objects in one or a plurality of first images and a detection result of one or a plurality of target objects in one or a plurality of second images (step S230). For example, FIG. 6 is a schematic diagram of trajectory matching according to an embodiment of the invention. Referring to FIG. 6, there may be differences between trajectories T1 and T2 of target objects O3 and O4 mapped on the electronic map. The processor 130 may judge similarity of the two trajectories T1 and T2 and determine whether they are the same target object accordingly.

In an embodiment, the processor 150 may determine representative information of a first object in the target objects detected from the first image or the second image. The representative information may be the object type, bounding box, identification code, moving speed, trajectory, and/or coordinates obtained from the aforementioned detection results.

The processor 150 may determine whether the first object is a tracked target according to the representative information of the first object. The processor 150 may classify the first object according to the object type or the identification code. It should be noted that depending on different requirements, the object type may be related to various appearance features. Taking people as an example, the appearance features are, for example, skin color, gender, height, or fatness or thinness. Taking cars as an example, the appearance features are, for example, brand, car type, color, or model.

On the other hand, the tracked target is a matched or unmatched target object in the first image and/or the second image. Matched means confirming that the target objects in the two images are the same. Unmatched means that the target object in an image cannot be found identical in another image. The processor 150 may compare the sameness or similarity between the representative information of the first object and the representative information of the tracked target. For example, the processor 150 may confirm whether the object type of the first object is the same as that of the tracked target and further compare the positions, speeds, and/or trajectories of the first object and the tracked target.

The processor 150 may match the detection result of the target object according to a determination result of the tracked target. In response to the fact that the first object is not a tracked target (i.e., the first object is a target that has not appeared before), the processor 150 may determine whether the first object in the first image is a second object in the second image. Namely, target matching of multiple image capturing apparatuses is performed.

In an embodiment, in addition to the comparison on such as object type, bounding box or identification code, the processor 150 may determine an allowable range according to a trajectory and a moving speed of the first object in the first image. The processor 150 may determine the trajectory and the moving speed by comparing the preceding and following images. The processor 150 may take a last position of the trajectory of the first object as a center and extend outward to form the allowable range. For example, an outwardly extending distance is a product of the moving speed and a photographing time difference between the first image and the second image. The processor 150 may determine whether the second object in the second image is within the allowable range. This allowable range is for an error in trajectory estimation and/or movement within the time difference. If the second object is within the allowable range, the processor 150 may identify the second object and the first object to be the same. If the second object is not within the allowable range, the processor 150 may regard the second object and the first object as the different objects. Similarly, the processor 150 may also determine another allowable range based on the second object in the second image and determine whether the first object in the first image is within the allowable range.

Figure 7A:
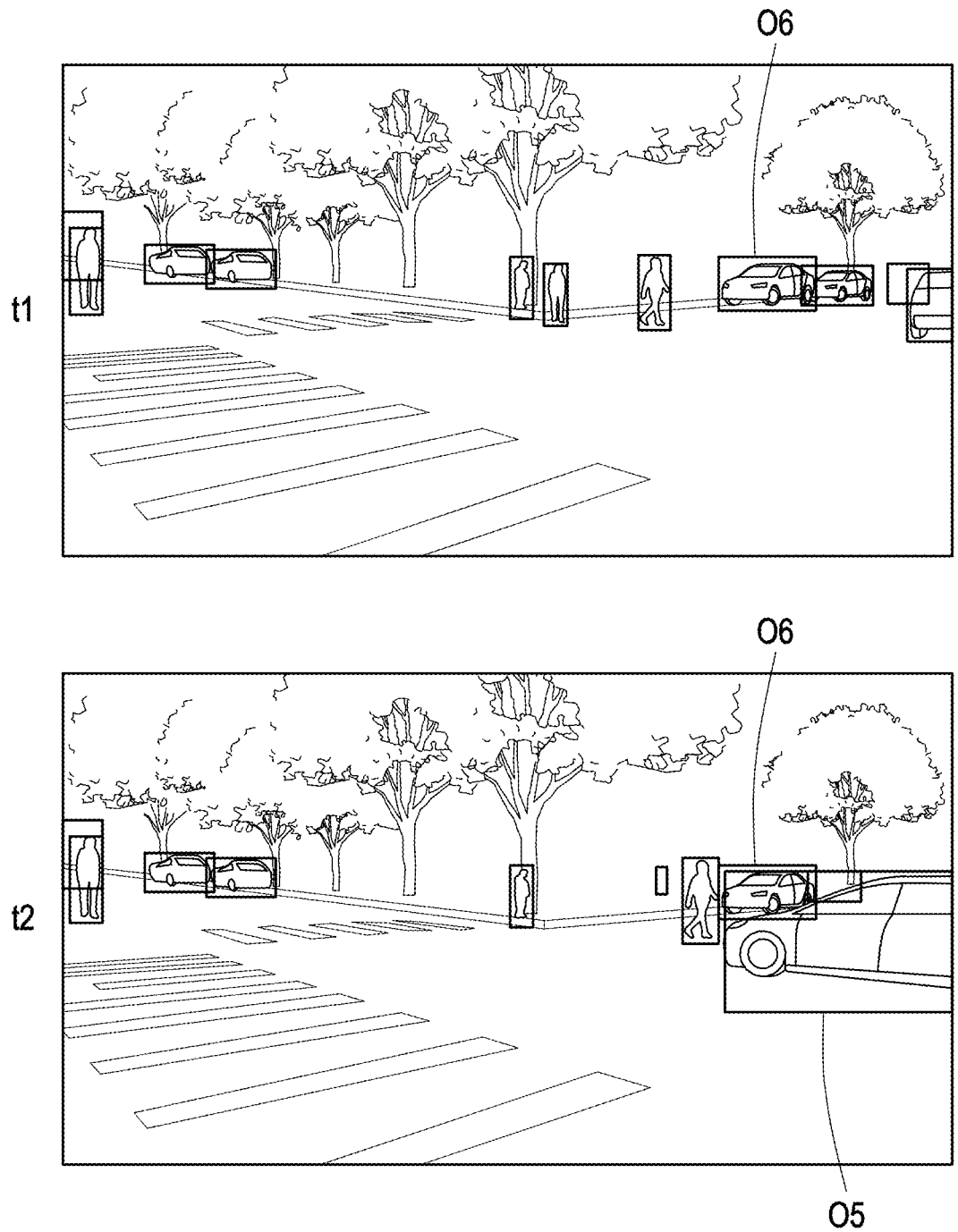
FIG. 7A is a schematic diagram of a detection result of a first image according to an embodiment of the invention.
Figure 7B:
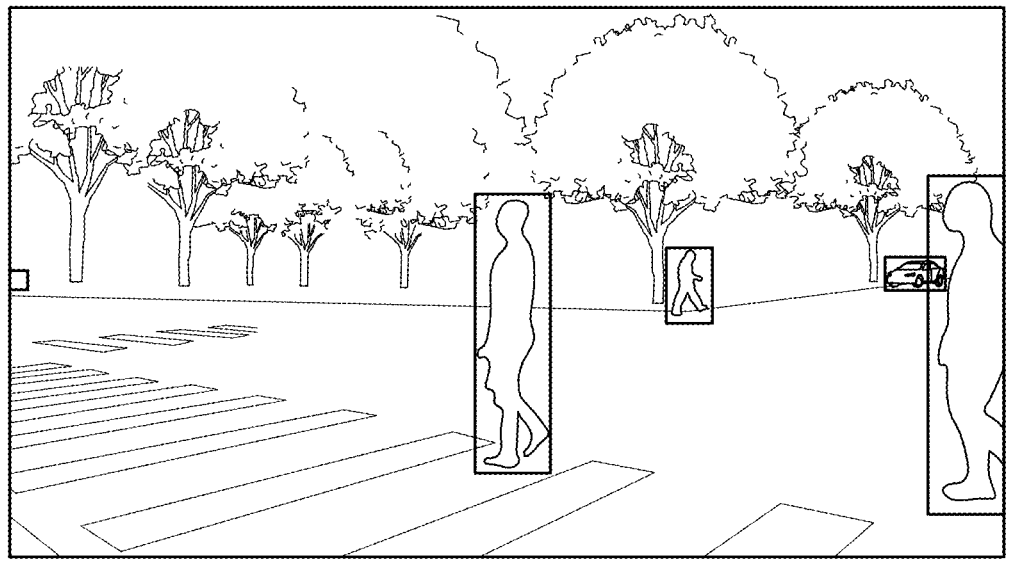
FIG. 7B is a schematic diagram of a detection result of a second image according to an embodiment of the invention.
Figure 7B:
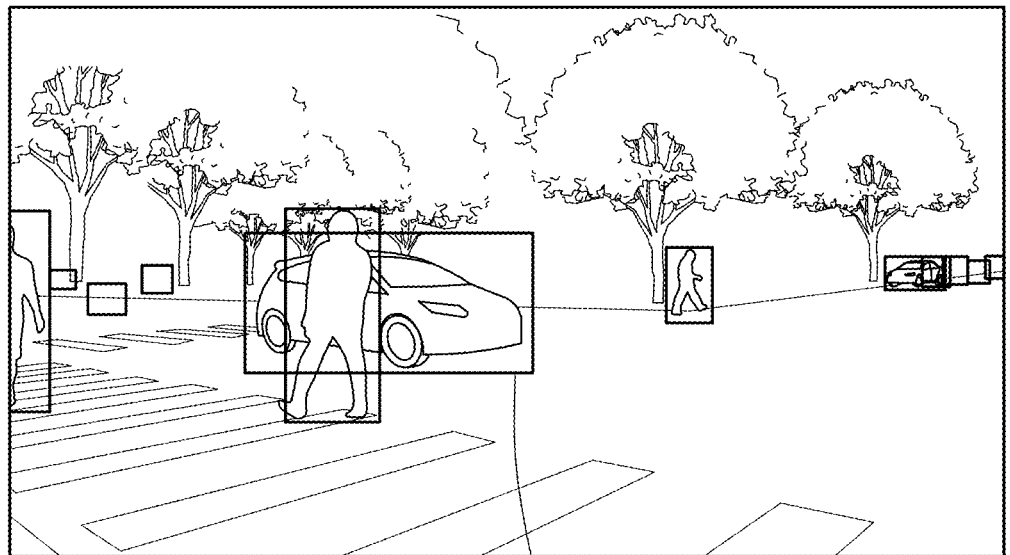

For example, FIG. 7A is a schematic diagram of a detection result of a first image according to an embodiment of the invention, and FIG. 7B is a schematic diagram of a detection result of a second image according to an embodiment of the invention. Referring to FIG. 7A, there is a target object O6 at a time point t1, and a target object O5 appears at a time point t2. Referring to FIG. 7B, the target object O5 appears at the time point t2.

Figure 8:
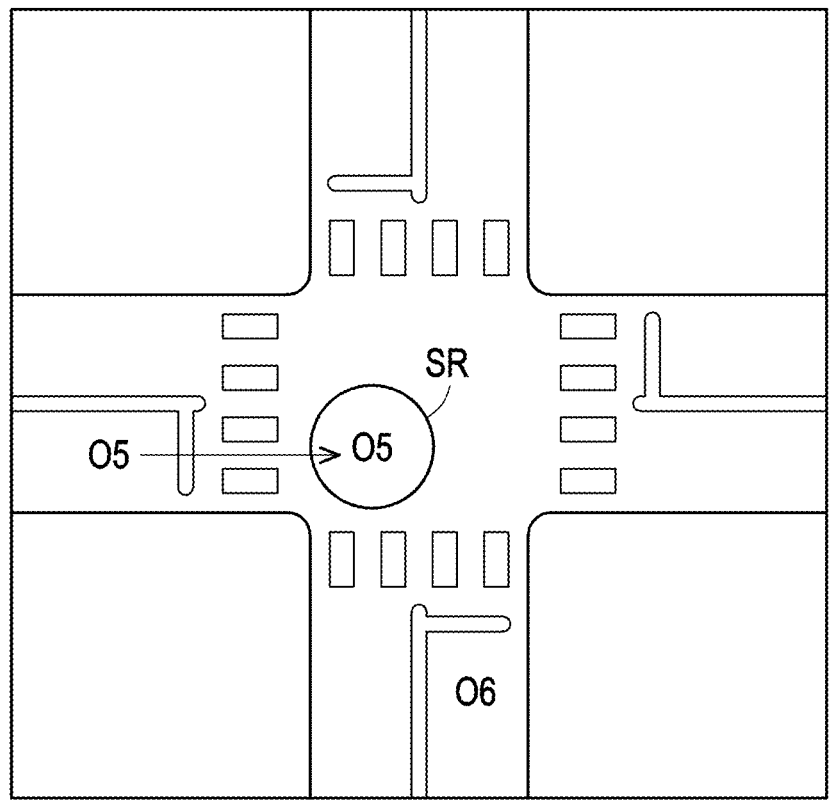
FIG. 8 is a schematic diagram of object matching according to an embodiment of the invention.

FIG. 8 is a schematic diagram of object matching according to an embodiment of the invention. Referring to FIG. 8, taking the second image as an example, a circle extending outward from a last position (for example, a position at the time point t2) of the trajectory of the target object O5 from the time point t1 to the time point t2 is taken as an allowable range SR. It is assumed that the moving speed of the object O5 is 10 meters per second and the difference of the photographing time between the first image and the second image is 0.1 second, a radius of the allowable range SR may be 1 meter. The target object O5 in the first image is located within the allowable range SR, so the target objects O5 in the two images are regarded to be the same. The target object O6 is not located within the allowable range SR, so that the target objects O5 and O6 are regarded to be different.

In an embodiment, the processor 150 may pair one or plurality of target objects in one or plurality of first images with one or plurality of target objects in one or plurality of second images by using a combination optimization algorithm. The combination optimization algorithm is, for example, the Hungarian algorithm, the Kuhn-Munkres algorithm (K-M algorithm), or a dual method. For example, regarding a last position of any trajectory in the first image and the second image, the processor 150 may calculate a distance between latitude and longitude coordinates of the two positions by using a haversine formula and determine a distance spending matrix accordingly. Distance spending represents a distance taken from any location to another location. The processor 150 may set a maximum distance threshold and use the Hungarian algorithm to determine whether the trajectories in the first image and the second image are matched or paired with each other.

Referring to FIG. 2, the processor 150 may update the detection result of the target object according to a matching result between the detection result of the one or plurality of first images and the detection result of the one or plurality of second images (step S240). In an embodiment, in response to the fact that the first object is the tracked target, the processor 150 may update a position of the tracked target. For example, a position of the first object is taken as a final position of the tracked target, and information such as moving speed, trajectory, etc., are updated accordingly.

In an embodiment, in response to the fact that the first object is not the tracked object and the first object and the second object are the same, the processor 150 may integrate the representative information of the two objects to use as a new single tracked object. For example, a middle point of the positions of the two objects is taken as the final position, and the same identification code is used.

In an embodiment, in response to the fact that the first object is not the tracked object and the first object and the second object are different, the processor 150 may respectively use the two objects as two new tracked objects.

It should be noted that in the above description, image integration of two image capturing apparatuses is taken as an example for description. However, in accordance with the spirit of the invention, it may be extended to image integration of more image capturing apparatuses.

In summary, in the object tracking integration method and the integrating apparatus of the embodiments of the invention, target objects in images from different image capturing apparatuses may be matched. Where, the target matching (association) is performed by using the positions, trajectories, and moving speeds in the common space, and the tracked target may also be updated. In this way, the matching accuracy may be improved, and a monitoring coverage area may be increased through multiple image capturing apparatuses. In addition, the single image capturing apparatus may avoid missing detection due to object overlapping. The embodiments of the invention may also be applied to application situations such as traffic management, business monitoring, work monitoring, etc.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. An object tracking integration method, comprising:
obtaining at least one first image and at least one second image, wherein the at least one first image is from a first image capturing apparatus, and the at least one second image is from a second image capturing apparatus;
detecting at least one target object in the at least one first image and in the at least one second image, comprising:
cropping a region of interest from the first image to generate a cropped image with only the region of interest;
respectively detecting the at least one target objects in the first image and the cropped image, to obtain a detection result of the at least one target objects in the first image and a detection result of the at least one target objects in the cropped image, wherein the detection result of the at least one target object comprises representative information of the at least one target object; and
combining the detection result of the at least one target object in the first image and the detection result of the at least one target object in the cropped image, wherein a union of the detection results of two images, which comprises a same target object detected in the first image and the cropped image, is taken as a combination of the detection result in the first image and the detection result in the cropped image;
matching a detection result of the at least one target object in the at least one first image and a detection result of the at least one target object in the at least one second image; and
updating the detection result of the at least one target object according to a matching result between the detection result of the at least one first image and the detection result of the at least one second image.

2. The object tracking integration method according to claim 1, wherein the detection result comprises a pixel position, and the step of detecting the at least one target object in the at least one first image and in the at least one second image comprises:

transforming a pixel position of the at least one target object in the at least one first image and in the at least one second image into a position and a moving speed in a common space with a homography transformation.

3. The object tracking integration method according to claim 1, wherein the step of matching the detection result of the at least one target object in the at least one first image and the detection result of the at least one target object in the at least one second image comprises:

pairing the at least one target object in the at least one first image and the at least one target object in the at least one second image with a combination optimization algorithm.

4. The object tracking integration method according to claim 1, wherein the step of matching the detection result of the at least one target object in the at least one first image and the detection result of the at least one target object in the at least one second image comprises:

determining representative information of a first object among the at least one target object;
    determining whether the first object is a tracked target according to the representative information of the first object; and
    matching the detection result of the at least one target object according to a determination result of the tracked target.

5. The object tracking integration method according to claim 4, wherein the representative information comprises at least one of an object type, a bounding box, an identification code, and coordinates.

6. The object tracking integration method according to claim 4, wherein the step of updating the detection result of the at least one target object comprises:

updating a position of the tracked target in response to determining that the first object is the tracked target.

7. The object tracking integration method according to claim 4, wherein the step of matching the detection result of the at least one target object in the at least one first image and the detection result of the at least one target object in the at least one second image comprises:

determining whether the first object in the at least one first image is a second object in the at least one second image in response to determining that the first object is not the tracked target.

8. The object tracking integration method according to claim 7, wherein the step of determining whether the first object in the at least one first image is the second object in the at least one second image comprises:

determining an allowable range according to a trajectory and a moving speed of the first object in the at least one first image; and
    determining whether the second object in the second image is within the allowable range.

9. The object tracking integration method according to claim 1, wherein the step of detecting the at least one target object in the at least one first image comprises:

replacing a bounding box obtained by an object tracking with a bounding box obtained by an object detection.

10. An integrating apparatus, comprising:

a memory, configured to store a program code; and
    a processor, coupled to the memory, and configured to load and execute the program code to:
    obtain at least one first image and at least one second image, wherein the at least one first image is from a first image capturing apparatus, and the at least one second image is from a second image capturing apparatus;
    detect at least one target object in the at least one first image and in the at least one second image, wherein the processor is further configured to:
    crop a region of interest from the first image to generate a cropped image with only the region of interest;
    respectively detect the at least one target objects in the first image and the cropped image, to obtain a detection result of the at least one target objects in the first image and a detection result of the at least one target objects in the cropped image, wherein the detection result of the at least one target object comprises representative information of the at least one target object; and
    combine the detection result of the at least one target object in the first image and the detection result of the at least one target object in the cropped image, wherein a union of the detection results of the two images, which comprises a same target object detected in the first image and the cropped image, is taken as a combination of the detection result in the first image and the detection result in the cropped image;
    match a detection result of the at least one target object in the at least one first image and a detection result of the at least one target object in the at least one second image; and
    update the detection result of the at least one target object according to a matching result between the detection result of the at least one first image and the detection result of the at least one second image.

11. The integrating apparatus according to claim 10, wherein the detection result comprises a pixel position, and the processor is further configured to:

transform a pixel position of the at least one target object in the at least one first image and in the at least one second image into a position and a moving speed in a common space with a homography transformation.

12. The integrating apparatus according to claim 10, wherein the processor is further configured to:

pair the at least one target object in the at least one first image and the at least one target object in the at least one second image with a combination optimization algorithm.

13. The integrating apparatus according to claim 10, wherein the processor is further configured to:

determine representative information of a first object among the at least one target object;
    determine whether the first object is a tracked target according to the representative information of the first object; and
    match the detection result of the at least one target object according to a determination result of the tracked target.

14. The integrating apparatus according to claim 13, wherein the representative information comprises at least one of an object type, a bounding box, an identification code, and coordinates.

15. The integrating apparatus according to claim 13, wherein the processor is further configured to:

update a position of the tracked target in response to determining that the first object is the tracked target.

16. The integrating apparatus according to claim 13, wherein the processor is further configured to:

determine whether the first object in the at least one first image is a second object in the at least one second image in response to determining that the first object is not the tracked target.

17. The integrating apparatus according to claim 16, wherein the processor is further configured to:
   determine an allowable range according to a trajectory and a moving speed of the first object in the at least one first image; and
   determine whether the second object in the second image is within the allowable range.

18. The integrating apparatus according to claim 10, wherein the processor is further configured to:
   replace a bounding box obtained by an object tracking with a bounding box obtained by an object detection.

\* \* \* \* \*